Figure 1:
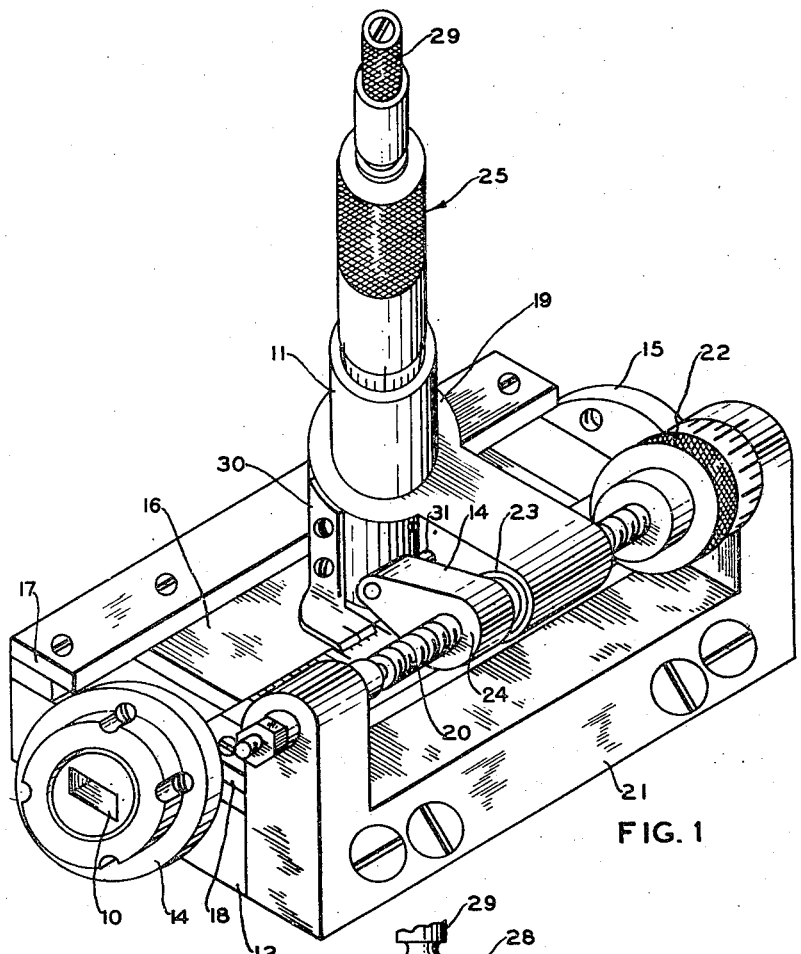

INVENTOR.
ARNOLD T. NORDSIECK
BY William D. Hall
ATTORNEY

Patented Mar. 16, 1948

2,437,889

UNITED STATES PATENT OFFICE 2,437,889

HIGH-FREQUENCY TUNING DEVICE

Arnold T. Nordsieck, New York, N. Y., assignor to the United States of America as represented by the Secretary of War Application November 27, 1945, Serial No. 631,176

4 Claims. (Cl. 178—44)

The present invention pertains generally to ultra high frequency measurement and more particularly to a roving stub tuner device for setting up in a wave guide adapted to propagate centimeter wave energy, standing waves variable in ratio and of adjustable phase.

It is necessary in certain ultra high frequency measuring techniques to create a standing wave within a transmission medium such as a wave guide. For instance, in investigating the influence of a load impedance on the operation of a magnetron oscillator it is desirable to be able to introduce an arbitrary standing wave ratio and vary its phase. By selecting various values of standing wave ratio and altering the phase of each, the whole impedance plane may readily be plotted.

One conventional device suitable for accomplishing this test procedure is commonly known as the double slug tuner. It comprises essentially a pair of spaced metal or dielectric slugs inserted into a wave guide. Standing waves are set up in the guide by the slug pair, the standing wave ratio being governed by the spacing between slugs. The slugs are moved in the guide by external screws connected thereto through a narrow longitudinally disposed slot in the guide. Two adjustments are provided, one for controlling the slug separation, and thereby the standing wave ratio, the other for displacing the slug pair lengthwise along the guide, and thereby varying the phase of reflected wave. Commencing with a matched load, the desired standing wave is introduced by properly spacing the slugs; then the phase is varied by moving the two slugs as a unit.

For measurements in the centimeter wave region a major drawback arises in the use of a double slug tuner or any other device and entailing a screw or probe which is inserted in the guide. Due to the small guide cross-sectional dimensions requisite to this region and the voltage gradient across the guide, the insertion of a slug or a like obstacle causes spark over in the guide.

Accordingly, it is the primary object of this invention to provide a device for setting up standing waves in a wave guide without the physical insertion therein of a slug or any other element likely to cause voltage breakdown.

It is another object of this invention to provide a device of the above type adapted to establish an arbitrary standing wave ratio adjustable in phase.

Yet another object of this invention is to provide a device of the above type capable of fine adjustment and which is of compact and sturdy construction.

In general terms, the invention contemplates a roving stub tuner comprising a main wave guide having a stub wave guide branching therefrom. Incorporated in the stub guide are means to vary the length thereof, whereby wave reflection results as the length of the stub guide departs from zero or one-half wave length at the frequency of energy propagated therein. Means are also provided for displacing the stub guide lengthwise along the main guide whereby the phase of the reflected wave is varied without affecting the predetermined standing wave ratio.

For a better understanding of this invention, as well as other objects and features thereof, reference is had to the following detailed description to be read in connection with the accompanying drawing wherein like elements are identified by like characters. The scope of the invention will be pointed out and defined in the annexed claims.

Figure 2:
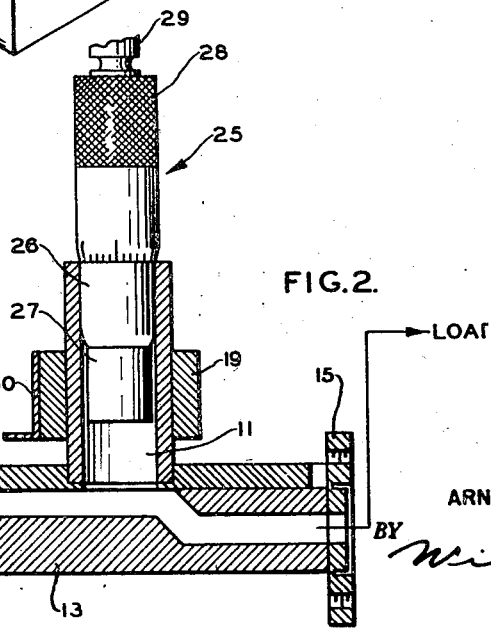

In the drawing:

Figure 1 illustrates in an isometric view a preferred embodiment of a stub tuner in accordance with the invention, and Figure 2 is a longitudinal partial section taken through the device of Figure 1.

Referring now to the figures of the drawing the roving stub tuner comprises a main wave guide 10 and a sliding stub guide 11 branching from the main guide. The walls of main guide 10 are defined by a rectangular bore of uniform cross section extending longitudinally through a rectangular bed plate 12. The path taken by the bore is offset or stepped at the central portion 13 of bed plate 12 whereby the bore is aligned with the upper surface of the plate to open guide 10 for the length of the offset. The design of the offset will be referred to hereinafter in this specification.

To enable mechanically coupling between guide 10 and a source of radio frequency energy, a circular flange 14 is secured to one end of bed plate 12, said flange having a central rectangular aperture coinciding with main guide 10. Similarly, to couple guide 10 to an output load circuit a circular flange 15 is connected to the other end of bed plate 12, said flange having a rectangular circular aperture coinciding with main guide 10.

Covering the opening in guide 10 is a sliding wall 16 in the form of a rectangular slot which is arranged to slide lengthwise along the upper surface of bed plate 12 in a channel erected by bars 17 and 18 affixed in parallel positions at opposite sides of the upper surface of bed plate 12. The movement of sliding wall 16 is restricted at one end by flange 14 and at the other end by flange 15, and the length of sliding wall 16 is such as to completely cover the opening in guide 10 within the limits of its movement.

Stub guide 11 is of circular cross section and is vertically mounted on sliding wall 16 in a central position.

A circular aperture cut in sliding wall 16 at the position coincident with the passage in stub guide 11 serves to couple same to main guide 10. The dimensions of sliding wall 16 and the position of stub guide 11 are such as to enable coupling between stub guide 11 and main guide 10 for all positions along the length of the opening in the latter.

Vernier movement of sliding wall 16 is effected by means of a screw operated arm 19 having one end shaped as a ring through which stub guide 11 extends, and having a threaded bore at the other end to receive a screw shaft 20. Screw shaft 20 is pivoted at its ends by means of a trunnion support 21 whose base is secured to one side of bed plate 12, the trunnion pivot pins being inserted in suitable recesses at the extremities of the screw shaft. By rotating the head 22 of shaft 20, head 22 being partially knurled for this purpose, arm 19 is caused to advance along the axis of the shaft, thereby shifting the position of stub guide 11 with respect to main guide 10.

Pressure is applied against arm 19 to prevent undesired play thereof on shaft 20, the pressure being applied by a helical spring 23 concentric with the shaft and forced between one side of arm 19 and the complementary side of an adjacent lug 24 carried on screw shaft 20. A pin 31 connects lug 24 to arm 19 to prevent rotation of the lug.

The effective length of stub guide 11 is varied by means of a micrometer 25 whose sleeve 26 is partially contained within stub guide 11 and whose movable spindle 27 is controlled by rotation of thimble 28 or ratchet knob 29. The spindle 27 is fitted with a wave trap or choke type non-contacting piston which provides a (movable) effective short circuit for the stub guide. The upper surface of bar 18 is inscribed with suitable indicia to enable calibration of the movement of sliding wall 16, the position of the sliding wall being read by means of a pointer 30 carried by arm 19. A divisional reading of the indicia along bar 18 is afforded by means of indicia inscribed circumferentially on head 22.

In operation, movable spindle 27 is projected or withdrawn in stub guide 11 to a point where a desired degree of discontinuity is introduced into main guide 10 to establish an arbitrary standing wave ratio, then the stub guide 11 is shifted along main guide 10 to vary the phase of the standing wave without upsetting the predetermined standing wave ratio. Main guide 10 because of its stepped form is of uniform cross section throughout its length, and in the absence of a stub guide 11 will not by itself introduce any reflection because of an impedance discontinuity. Hence the extent of reflection is controlled solely by stub guide 11. Since no obstacle is inserted in main guide 10 to set up standing waves therein, the roving stub tuner is relatively free from voltage breakdown.

It is desirable in the construction of the device to carefully lap the upper surface of plate 12 and the under surface of sliding wall 16 in order that these surfaces be perfectly plane so that the main guide 10 is always fully enclosed.

The double bend at either end of the offset portion of the wave guide is designed to maintain an impedance match between the non-offset portions and the offset portion of the wave guide over a wide range of frequencies. This is accomplished by making each bend a symmetrical mitered bend of the same angle and by making the distance between the two bends of a pair, measured parallel to the slanting portion of the wave guide, equal to one quarter of the guide wave length at midband.

While there has been described what is at present considered a preferred embodiment of the invention it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A roving stub tuner comprising a plate having a bore of rectangular cross section extending longitudinally therethrough to define a main wave guide, said bore being offset for a portion of its length so as to be aligned with a surface of said plate to provide a longitudinal opening in said main wave guide, a stub wave guide coupled to said main wave guide through said opening, means for adjusting the length of said stub guide to set up standing waves of an arbitrary ratio in said main wave guide, and means for adjusting along said opening the position of said stub wave guide to vary the phase of said standing waves.

2. A roving stub tuner comprising a plate having a bore of rectangular cross section extending longitudinally therethrough to define a main wave guide, said bore being offset for a portion of its length so as to be aligned with the upper surface of said plate to provide a longitudinal opening in said main wave guide, an overlapping sliding wall covering said opening, said sliding wall being adapted for longitudinal movement, a stub wave guide mounted on said sliding wall and coupled to said main wave guide by an aperture in said wall, means for adjusting the length of said stub wave guide to set up standing waves in said main wave guide of an arbitrary ratio, and means for adjusting the longitudinal position of said stub wave guide on said main wave guide to vary the phase of said standing waves.

3. A roving stub tuner as in claim 2 wherein said means for adjusting the length of said stub wave guide comprises an adjustable micrometer having a movable spindle inserted in said stub guide.

4. A roving stub tuner comprising an element of conducting material having a bore extending therethrough to define a main wave guide, said bore being offset for a portion of its length to align a surface of said bore with a surface of said element thereby providing an opening along said wave guide, an overlapping sliding wall covering said opening, said sliding wall being movable along said wave guide, a stub wave guide mounted on said sliding wall and coupled to said main wave guide by an aperture in said wall, means for adjusting the length of said stub wave guide, and means for adjusting the position of said stub wave guide along said main wave guide.

ARNOLD T. NORDSIECK.

REFERENCES CITED

The following references are of record in the file of this patent:

UNITED STATES PATENTS

| Number | Name | Date |
|---|---|---|
| 2,373,233 | Dow | Apr. 10, 1945 |
| 2,404,797 | Hansen | July 30, 1946 |